(12) United States Patent
Callon et al.

(10) Patent No.: US 6,870,849 B1
(45) Date of Patent: Mar. 22, 2005

(54) APPARATUS AND METHOD FOR EFFICIENT HASHING IN NETWORKS

(76) Inventors: Ross W. Callon, 18 Applewood Dr., Westford, MA (US) 01886; James D. Carlson, 25 Essex St., North Andover, MA (US) 01845; Douglas C. Ehlert, 329 Forrest St., Dunstable, MA (US) 01827; Yuval Peduel, 1276 Pecos Way, Sunnyvale, CA (US) 94089

( * ) Notice: Subject to any disclaimer, the term of this patent is extended or adjusted under 35 U.S.C. 154(b) by 771 days.

(21) Appl. No.: 09/610,278

(22) Filed: Jul. 6, 2000

(51) Int. Cl.[7] ............................................. H04L 12/56
(52) U.S. Cl. ................................... 370/395.32; 370/400
(58) Field of Search ................................ 370/389, 392, 370/393, 395.32, 395.7, 394, 497; 711/216

(56) References Cited

U.S. PATENT DOCUMENTS

| | | | | |
|---|---|---|---|---|
| 5,978,951 A | * | 11/1999 | Lawler et al. | 714/758 |
| 6,044,080 A | * | 3/2000 | Antonov | 370/401 |
| 6,091,725 A | * | 7/2000 | Cheriton et al. | 370/392 |
| 6,111,877 A | * | 8/2000 | Wilford et al. | 370/392 |
| 6,397,260 B1 | * | 5/2002 | Wils et al. | 709/238 |
| 2002/0097736 A1 | * | 7/2002 | Cohen | 370/419 |

OTHER PUBLICATIONS

Inventor Ross W. Callon's Statement Attached to Inventor's Declaration, dated Aug. 18, 2000.

* cited by examiner

Primary Examiner—Huy D. Vu
Assistant Examiner—Daniel Ryman
(74) Attorney, Agent, or Firm—Donald R. Boys; Central Coast Patent Agency

(57) ABSTRACT

An apparatus and method for efficient hashing uses both an identifying portion of a data packet, e.g., source and destination ID, and an identifying value of the node, e.g., the IP address of the node, to generate a hash result. By inserting a unique value into the hash operation at each node, the invention effectively provides for a different hash implementation at each node. As a result, in situations where multiple paths or multiple links within a path are available to forward packets, traffic can be split over the multiple paths and links. Inefficient utilization of network links found in prior systems which use the same hash operation at each node are eliminated.

26 Claims, 2 Drawing Sheets

Use of Multipath in a Datagram IP network

Multi-Link case.

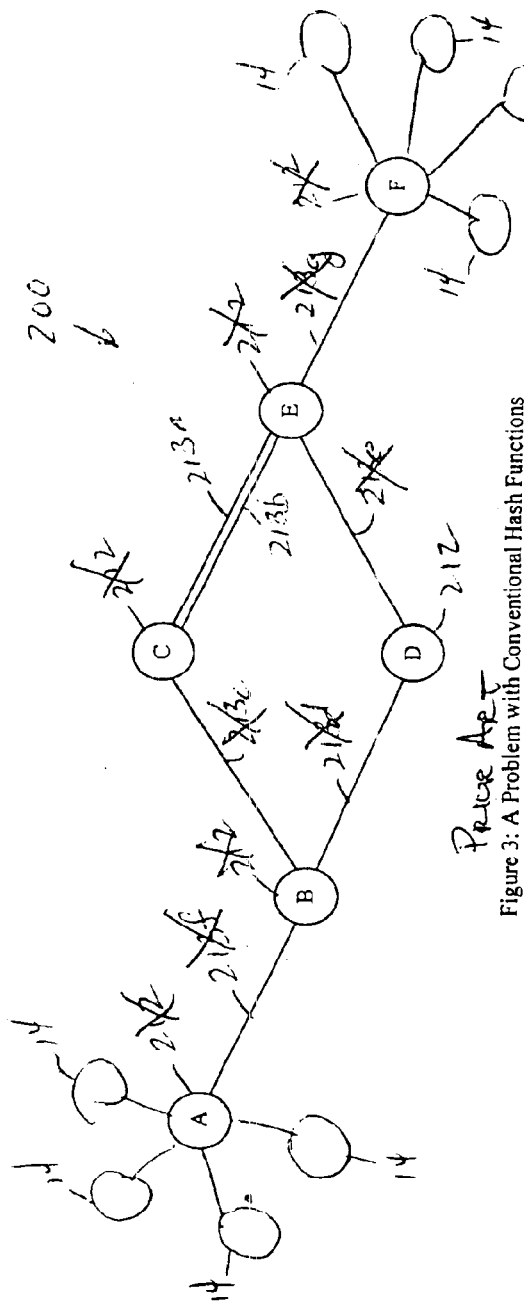
Figure 3: A Problem with Conventional Hash Functions
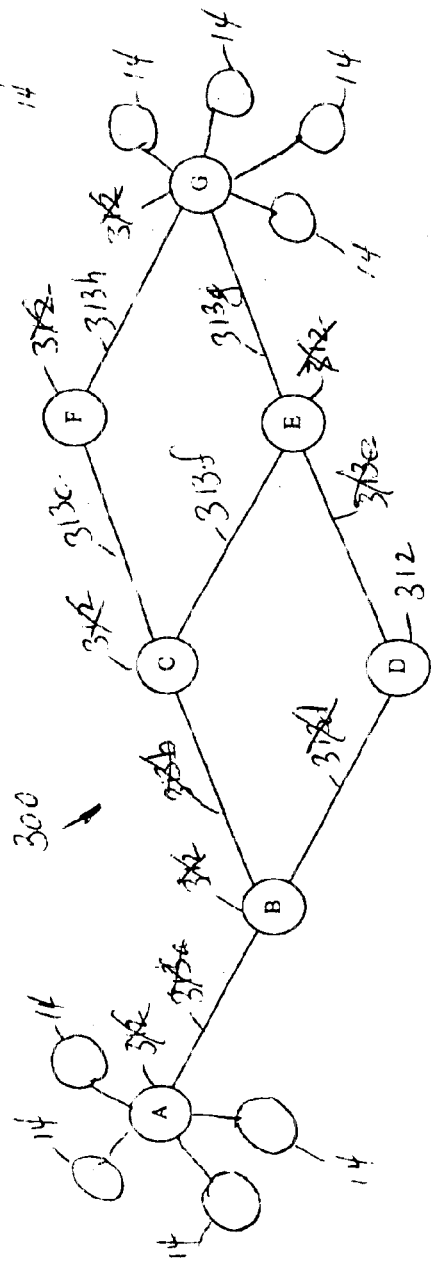
Figure 4: Another Example of The Problem

APPARATUS AND METHOD FOR EFFICIENT HASHING IN NETWORKS

FIELD OF THE INVENTION

The present invention is related to techniques for forwarding data packets on networks and is more particularly related to a technique for forwarding encapsulated data packets on a network in which network nodes are in general connected by multiple paths.

BACKGROUND OF THE INVENTION

In digital computer networks such as the Internet, collections of data, referred to as "datagrams", are typically transferred from node to node over the network in packets. Each packet of data typically includes a header portion and a data portion. In accordance with the common Internet protocol (IP), the header portion typically includes a 32-bit source identifying portion which identifies the source node that originated the packet and a 32-bit destination identifying portion which identifies the destination node to which the packet is ultimately to be transferred. A packet header can also include other predefined fields such as a protocol field.

At each node, a router is used to forward the packet to the next node in the path toward the destination node. When a router receives a packet, it examines the destination address in the packet header. It then searches its locally stored routing table to determine the next node to which the packet should be transferred in order to ensure that it will reach its destination, typically along the shortest possible path. The router then forwards the packet to the next node identified in the routing table. This process continues at each successive node until the destination node is reached.

In many cases, in such a datagram IP network, when forwarding an IP packet, there are situations in which there are two or more choices for the next step or "hop" that the packet can take, i.e., the next node to which the packet is to be forwarded. FIG. 1 contains a schematic block diagram of a conventional IP packet forwarding network 10. The network 10 includes multiple nodes 12 connected by links 13. Referring to FIG. 1, the case in which IP packets are forwarded from node A to node F, for example, is considered. In this situation, node A will forward the packet to node B. Node B can forward the packet toward node E along a first path via node C or along a second path via node D.

In general, multiple hosts 14 are coupled to each node A and F. A host 14 coupled to node A may have a sequence of multiple IP packets destined for another host 14 attached to node F. It is desirable to keep the packets associated with any one host-to-host flow in order. This is important to improve the efficiency of communication. For example, in many cases, the hosts 14 may be running Internet applications over the Transmission Control Protocol (TCP), and TCP may make use of "slow start." When applications are making use of TCP slow start, if packets are delivered out of order, the TCP implementation assumes that the misordering of packets is caused by congestion in the network. In response, the rate of traffic transmitted may be reduced. If in fact there is no congestion in the network, then this will result in less efficient use of the network. In any case, it is often advisable if not critical that packets associated with the same source/destination node pair be transferred on the same series of links.

Typically, IP routers solve this problem by choosing between multiple equal-cost choices for the next hop for a particular packet. The router typically performs an analysis of the packet header contents to assign each packet to a link. Usually, this involves a hash function of the five-tuple of fields in the IP header, i.e., source IP address, destination IP address, protocol, source port number, destination port number, or a subset of these fields, such as source IP address and destination IP address. A hash function is designed to perform a computation on one or more data words and return a unique data word of shorter length. For example, a hash function performed on two 32 bit IP addresses may divide the combined 64-bit word by a constant and return as a result the value of the reminder in fewer bits, e.g., five. Other hash procedures include the use of a cyclic redundancy check (CRC) and/or the use of a checksum.

Each time a hash procedure is performed on the same initial values, the same result is obtained. This ensures that packets associated with any one source/destination pair always take the same path, while simultaneously allowing different packets to take different paths. As noted above, sometimes additional fields may be used for the hash. It is noted that any packets belonging to the same flow of packets, i.e., packets which should be kept in order, will also contain the same protocol field in the IP header. Packets which contain a different value in the protocol field may therefore be safely transmitted on a different path. Similiarly, if the protocol field indicates that the next higher level protocol is TCP, then packets which contain different TCP port numbers can be routed on different paths. For these reasons, it is common for the hash to also take account of the protocol and port fields.

Thus, referring to FIG. 1, in general, multiple hosts 14 attached to node A send IP packets to multiple hosts 14 attached to router F. Under the technique described above, packets from any one source/destination pair will always be transmitted over the same path. Node B performs the hash function on each incoming packet. The result of the hash function is used to select either node C or node D as the next node, i.e., the node to which the packet is to be forwarded. Because the hash operation is performed on information in the packet that uniquely identifies its associated source/destination pair, all packets associated with that pair will be forwarded by node B to the same node, i.e., along the same path. The packets averaged over all of the source/destination pairs will in general be split, with some being sent along the path that includes node C and some being sent along the path that includes node D. This allows more efficient loading of the network 10 by splitting traffic among multiple available paths.

As the demand for data network services increases, it is becoming increasingly common for the interconnection between any two nodes to include multiple parallel links. Using multiple links increases the total bandwidth available for data transmission. Also, using multiple links allows for the possibility that if one link fails, there will still be a path through the network between any two nodes.

FIG. 2 is a schematic block diagram of a network 100 which includes multiple links 113 between nodes 112. Specifically, the nodes B, C, D and E in the core of the network 100 are shown interconnected using two parallel links 113 rather than a single link.

In this case, the same technique as described above for forwarding packets can be used. In particular, node B can perform a hash on the IP source and destination addresses. In this case, node B has four choices for possible links to use in forwarding a packet toward node F. Node B can therefore use a hash function with four possible output values. Each of the four links is considered a possible choice for forwarding of the data packet. In this case, as in the previous case, packets for any single source/destination pair will always go via the same link, i.e., via either one of the two links to C or one of the two links to D. However, the packets averaged over all of the source/destination pairs will generally be split, with some being sent via each of the four links. This allows for more efficient loading of the network by splitting traffic among multiple available paths as well as multiple available links within a path.

A problem occurs in conventional hashing which substantially reduces the effectiveness of the function. In a typical network, the same hashing function is used at every node in the network. Consequently, for a particular packet being forwarded along a path, the same hash function result is obtained at every node. Also, the packets that actually arrive at a particular node in the network are a function of the hash values that have been computed at other upstream nodes. This implies that the hash function, as implemented at any particular node, will not obtain all possible output values with the same probability. As a result of these factors, the conventional hashing function does not provide for utilization of the network resources in the most efficient fashion.

SUMMARY OF THE INVENTION

The present invention provides an approach to hashing which effectively performs a different hashing operation at each node along a path, such that the above drawbacks of prior approaches are avoided. The invention is directed to an apparatus and method for transferring data on a network which includes a plurality of nodes connected by a plurality of links. At least one of the nodes is connected to multiple links over which data can be forwarded from the node onto the network toward another node. The data includes an identifying portion which identifies a source node which originated the data and a destination node to which the data is to be transferred. The at least one node is associated with a node identifying value which serves to identify the node and distinguish the node from other nodes on the network. A link selection value, which is used to identify the one of the links out of the node on which the data is to be transferred, is generated using the identifying portion of the data and the node identifying value. Because the selection value is generated using the node identifying value, which is unique to the particular node, the selection value will depend on the particular node generating the value and will be different at each node, even for the same data having the same data identifying portion.

The data can be a packet of data and, in particular, can be an Internet Protocol (IP) data packet. The identifying portion of the packet can be at least a portion of the IP packet header. For example, the identifying portion can include the source node ID, the destination node ID and/or the protocol portion of the IP packet header. The node identifying value can be a single constant value which is configured in each router or can be a portion, e.g., the low-order bits, of the IP address of the node router.

In one embodiment, in generating the fink selection value, a logical operation, for example, a hash operation, is performed on the identifying portion of the data and the node identifying value. Again, the identifying portion of the data can include the source ID, the destination ID and/or the protocol fields of the header portion of the data packet. The hash operation can include a cyclic redundancy check (CRC) performed on the identifying portion of the data and the node identifying value.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a schematic block diagram of a network having multiple paths between nodes and one path with plural links between nodes.

FIG. 4 is a schematic block diagram of a network having multiple paths between nodes.

DETAILED DESCRIPTION OF PREFERRED EMBODIMENTS

Figure 1:
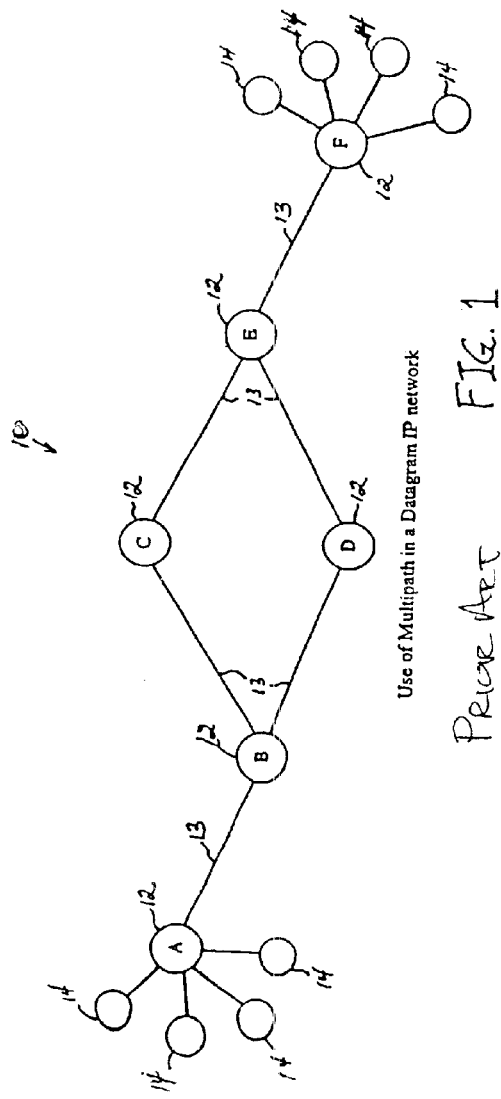
FIG. 1 is a schematic block diagram of a network having multiple paths between nodes.
Figure 2:
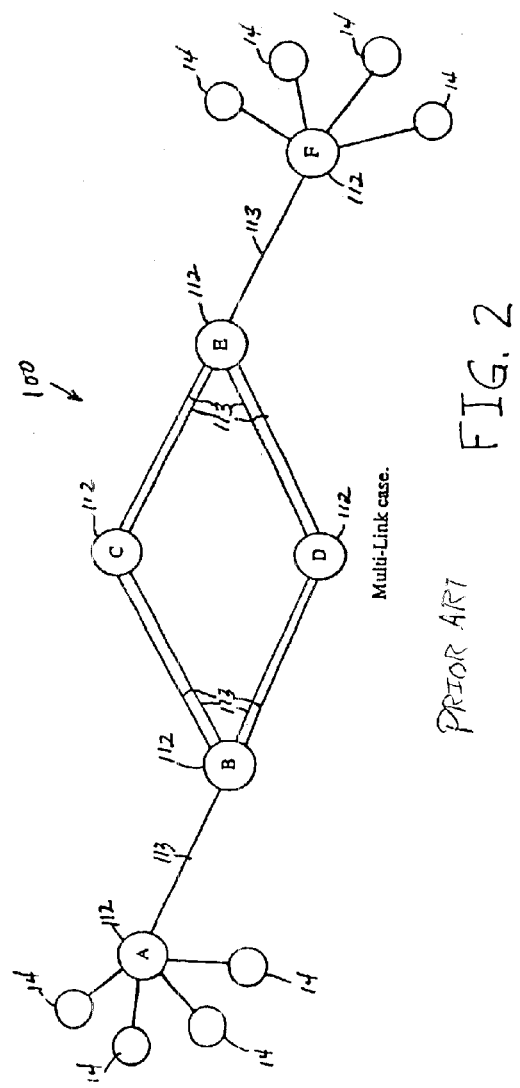
FIG. 2 is a schematic block diagram of a network having plural links between nodes.

FIG. 3 is a schematic block diagram of a configuration of a network 200 which is subject to one of the drawbacks of conventional hash functions. The network 200 is similar to the network 10 of FIG. 1, except that the network 200 uses a pair of parallel links 213a and 213b between nodes C and E. Here, in general, there are multiple packets being transmitted from hosts 14 which are attached directly or indirectly to router A toward hosts 14 which are attached directly or indirectly to router F.

In this case, router B may use multi-path, sending some packets via router C and some via router D. In a conventional hashing configuration, all of the routers A–F are implemented with the same hashing function. Given that the packets have various source addresses and/or various destination addresses, it is possible for router B to perform a hash function on the source and destination addresses in order to send some packets via node C and some via node D while sending all packets corresponding to a particular source/destination pair via the same path. This ensures that a good split of traffic is achieved on the B–C and B–D links, while preserving packet order within each individual host-to-host flow.

In the network 200 of FIG. 3, router C will forward all packets to node F via node E. However, it is noted that node C has two links to node E. Therefore, it is desirable to split the traffic equally across the two links. However, in most situations, router C will be an identical implementation to router B, or at least will implement the same hashing function to select paths for forwarding packets. As a result, router C will have the same output of the hashing function.

To illustrate the problem, it is assumed that the hashing function in the routers in the network 200 consists of a cyclic redundancy check (CRC) function on the IP source and destination addresses of packets. It is also assumed that all packets with an even result are sent on one link, and all packets with an odd result are sent on the other link. For example, at node B, it is assumed that all packets with an even result are sent to node C, and all packets with an odd result are sent to node D. Also, at node C, all packets with an even result of the CRC are sent on the upper link 213a to E, and all packets with an odd result are sent on the lower link 213b to node E.

The problem here is that all of the packets that arrive at node C (from A to F) will be packets for which the CRC hash function in this example returns an even result. Given that node C will perform the exact same hash function on the exact same fields in the IP packet, the same result will occur, meaning that all packets will result in an even hash value when the function is evaluated at node C. As a result, all packets will take the upper link 213a to node E, and the lower link 213b will not be used at all. This is a very unequal and inefficient utilization of the links from node C to E.

FIG. 4 is a schematic block diagram of another configuration of a network 300 which experiences a drawback in connection with a conventional hashing approach. In the network 300 illustrated in FIG. 4, data traffic is forwarded from hosts 14 attached to node A to hosts 14 attached to node G. Node C uses a hash function to select one of the two links 313c and 313f used to forward data toward node G via node F or node E, respectively. For illustration, it is again assumed that node B sends packets with an even hash value to node C and packets with an odd hash value to node D. It is also assumed that node C sends packets with an even hash value to node E and packets with an odd hash value to node F.

In this case, because of the hash operation performed at node B, node C receives only packets with even hash values. When node C performs its hash operation on the packets, only even results will be obtained, and all packets will be forwarded on link 313f to node E and on link 313g to node G. The links 313c to node F and 313h to node G would not be used at all, again resulting in very inefficient use of network resources.

In accordance with the invention, a different hash operation is performed at each node along a path such that these problems in conventional hashing approaches are eliminated. This approach ensures that a relatively equal splitting of traffic can be achieved at each node such that network resources are more efficiently utilized.

For general applications to networks, it would be difficult to implement a different hashing procedure at each node on a network, given the large number of nodes. Instead, the hashing operation of the invention operates on both specific fields in the data packet and an additional input value that is unique to each router. For example, the additional input value can be a single constant value configured in each router, or can be a portion, e.g., the low-order bits, of the IP address of the router. Hence, in one embodiment, the hashing operation can be performed on the source ID and destination ID of the packet being transferred and the IP address of the router. The hash operation produces a result that is unique to each router, even though the operation is performed for the same packet. As a result, the problems described above with conventional hashing procedures are eliminated.

In one embodiment, the particular hash operation performed at each node is a cyclic redundancy check (CRC) which includes the additional unique node-identifying input value. The CRC function behaves differently when the node-identifying unique value is used in accordance with the invention. To illustrate, it is assumed that a node is applying a CRC to a set of packets such that there are n possible outcomes. It is further assumed that there is a set of packets such that a CRC applied to those packets will result in only m unique values out of a space of n possible values, where m<n. If the CRC is instead applied to the same set of packets using another unique value, i.e., the node-unique value, then the CRC will now result in n unique values in the space of n possible values. This allows an effectively independent hash function to be applied at each node in a network.

Specifically, the CRC operation in accordance with the invention has two operands, namely, the input data for which the CRC is to be calculated and a fixed operand, often referred to as the generator polynomial. As known in the art, the generator polynomial is selected based on various characteristics of the CRC calculation, including the size of the CRC result. The CRC calculation is considered to be a division of polynomials with binary coefficients.

The CRC calculation involves taking the input data represented by such a polynomial and dividing by the generator polynomial. The remainder of the division is the CRC result. In practice, since a digital computer stores data as binary digits, polynomial arithmetic is implemented as binary arithmetic without carries between bit positions.

In one embodiment, the input data to the CRC calculation includes the information used to identify the packet of data being transferred. For example, the input data can include the source address and destination address from the packet header. In addition, the input data to the CRC also includes the node-identifying (node-specific) value. The two addresses as well as the node-specific value can be combined into a single long multiple-bit word. For example, in this illustrative embodiment, the source address and destination address are each 32 bits long, and the node specific value can be 16 bits long. Hence, the input data word to the CRC calculation is a single 80-bit word. This input data word is used to perform the CRC calculation with the preselected generator polynomial to produce the hash result. Because, the node-specific value is used as part of the CRC, the hash value is unique to the particular node router.

In another embodiment, the node-specific value is not part of the input data word to the CRC. Instead, it is used as an initial value for the CRC computation. In the CRC computation, a temporary register is used to store the updated value of the CRC result as the computation is performed. At each step of the calculation, this register is updated with the latest value of the CRC result. In accordance with this embodiment of the invention, the node-specific value is loaded into the temporary register before the calculation begins. The calculation is then performed on the generator polynomial and the input data, which in this case includes only the information from the packet being transferred, for example, the source address and destination address for the packet. Hence, the node-specific value is used in this case as an initial value for the CRC result which is updated as the calculation proceeds. Once again, because the node-specific value is used in the CRC computation, the hash produces a different result at each node for the same data packet.

While this invention has been particularly shown and described with references to preferred embodiments thereof it will be understood by those skilled in the art that various changes in form and details may be made therein without departing from the spirit and scope of the invention as defined by the appended claims.

What is claimed is:

1. A method of transferring data on a network, said network including a plurality of nodes connected by a plurality of links, at least one node being connected to more than one link over which the data can be transferred out of the at least one node, the method comprising: providing the data with an identifying portion which identifies a source node and a destination node for, the data; associating the at least one node with a node identifying value to distinguish the at least one node from other nodes on the network; and using the identifying portion of the data and the node identifying value, calculating a link selection value which identifies one of the more than one links connected to the at least one node to transfer the data out of the at least one node, wherein the link selection value is calculated by combining the identifying portion of the data and the node identifying value through a logical operation.

2. The method of claim 1 wherein the data is a packet of data.

3. The method of claim 2 wherein the packet is an Internet Protocol (IP) packet.

4. The method of claim 2 wherein the identifying portion of the data is at least a portion of a header of the packet.

5. The method of claim 4 wherein the identifying portion of the data includes a source node ID portion of the header.

6. The method of claim 4 wherein the identifying portion of the data includes a destination node ID portion of the header.

7. The method of claim 4 wherein the identifying portion of the data includes a protocol field of the header.

8. The method of claim 1 wherein the node identifying value is an Internet Protocol (IP) address of the at least one node.

9. The method of claim 1 wherein the logical operation comprises a hash operation.

10. The method of claim 9 wherein the identifying portion of the data includes a source node ID portion of the header.

11. The method of claim 9 wherein the identifying portion of the data includes a destination node ID portion of the header.

12. The method of claim 9 wherein the identifying portion of the data includes a protocol field of the header.

13. The method of claim 9 wherein the hash operation comprises performing a cyclic redundancy check (CRC) on the identifying portion of the data and the node identifying value.

14. An apparatus for transferring data on a network, said network including a plurality of nodes connected by a plurality of links, at least one node being connected to a plurality of links over which the data can be transferred out of the at least one node, the data being provided with an identifying portion which identifies a source node and a destination node for the data, and the at least one node being associated with a node identifying value to distinguish the at least one node from other nodes on the network, the apparatus comprising: an output interface over which the data can be forwarded to one of the plurality of links; and a processing device for calculating a link selection value using the identifying portion of the data and the node identifying value, said link selection value identifying one of the plurality of links connected to the at least one node to transfer the data out of the at least one node, wherein the link selection value is calculated by combining the identifying portion of the data and the node identifying value through a logical operation.

15. The apparatus of claim 14 wherein the data transferred by the apparatus is a packet of data.

16. The apparatus of claim 15 wherein the packet of data transferred by the apparatus is an Internet Protocol (IP) packet.

17. The apparatus of claim 15 wherein the identifying portion of the data used by the processing device to generate the link selection value is at least a portion of a header of the packet.

18. The apparatus of claim 17 wherein the identifying portion of the data used by the processing device to generate the link selection value includes a source node ID portion of the header.

19. The apparatus of claim 17 wherein the identifying portion of the data used by the processing device to generate the link selection value includes a destination node ID portion of the header.

20. The apparatus of claim 17 wherein the identifying portion of the data used by the processing device to generate the link selection value includes a protocol field of the header.

21. The apparatus of claim 14 wherein the node identifying value used by the processing device to generate the link selection value is an Internet Protocol (IP) address of the at least one node.

22. The apparatus of claim 14 wherein the logical operation performed by the processing device includes a hash operation.

23. The apparatus of claim 22 wherein the identifying portion of the data used by the processing device to generate the link selection value includes a source node ID portion of the header.

24. The apparatus of claim 22 wherein the identifying portion of the data used by the processing device to generate the link selection value includes a destination node ID portion of the header.

25. The apparatus of claim 22 wherein the identifying portion of the data used by the processing device to generate the link selection value includes a protocol field of the header.

26. The apparatus of claim 22 wherein the hash operation performed by the processing device comprises a cyclic redundancy check (CRC) on the identifying portion of the data and the node identifying value.

* * * * *